United States Patent [19]
Raymond et al.

[11] Patent Number: 5,632,113
[45] Date of Patent: *May 27, 1997

[54] FISHING BAIT AND TACKLE ORGANIZER

[75] Inventors: Jeffrey T. Raymond; Ronald D. Hoover, both of Baton Rouge, La.

[73] Assignee: Plano Molding Company, Plano, Ill.

[*] Notice: The portion of the term of this patent subsequent to May 24, 2013, has been disclaimed.

[21] Appl. No.: 399,928

[22] Filed: Mar. 7, 1995

Related U.S. Application Data

[63] Continuation of Ser. No. 65,436, May 24, 1993, Pat. No. 5,394,638.

[51] Int. Cl.$^6$ ............................................. A01K 97/00
[52] U.S. Cl. ..................................... 43/54.1; 43/57.1
[58] Field of Search ............................. 43/54.1, 57.1; 206/315.1, 315.11; 402/79; 281/21.1, 15.1

[56] References Cited

U.S. PATENT DOCUMENTS

| | | |
|---|---|---|
| 20,161 | 6/1858 | Bartleet. |
| 1,023,715 | 4/1912 | Bristol ................................. 402/79 |
| 1,156,160 | 10/1915 | Lewis ................................. 402/79 |
| 2,272,623 | 2/1942 | Runner ................................ 206/80 |
| 2,677,376 | 5/1954 | Brunner ............................... 402/79 |
| 2,902,996 | 9/1959 | Callen ................................. 129/20 |
| 3,029,939 | 4/1962 | Feldman ............................. 206/80 |
| 3,327,419 | 6/1967 | Stanos ................................ 40/124 |
| 3,392,477 | 7/1968 | Haugen .............................. 43/57.5 |
| 3,395,788 | 8/1968 | Gill ................................. 206/45.34 |
| 3,587,843 | 6/1971 | Wing ................................ 206/57 |
| 4,076,122 | 2/1978 | Hall ................................. 206/460 |
| 4,127,690 | 11/1978 | Schleifenbaum et al. ............ 402/79 |
| 4,151,938 | 5/1979 | Barker et al. ....................... 224/183 |
| 4,298,158 | 11/1981 | Hoppe et al. ........................ 229/69 |
| 4,401,219 | 6/1983 | Mink ................................ 206/566 |
| 4,467,551 | 8/1984 | Pulver ............................... 43/54.1 |
| 4,492,306 | 1/1985 | Cooper et al. ....................... 206/216 |
| 4,691,469 | 9/1987 | Alsobrook et al. ................. 43/54.1 |
| 4,703,581 | 11/1987 | Whittier ............................ 43/57.1 |
| 4,708,243 | 11/1987 | Nailon ............................. 206/315.11 |
| 4,825,584 | 5/1989 | Raley ............................... 43/57.1 |
| 4,831,772 | 5/1989 | Gillespie .......................... 43/54.1 |
| 4,852,293 | 8/1989 | Levine et al. ..................... 43/54.1 |
| 4,970,821 | 11/1990 | Young .............................. 43/54.1 |
| 5,018,897 | 5/1991 | Horgan ............................. 402/79 |
| 5,020,269 | 6/1991 | Gentry et al. ..................... 43/54.1 |

FOREIGN PATENT DOCUMENTS 705156  3/1954  United Kingdom ............. 402/79

Primary Examiner—Chuck Y. Mah
Attorney, Agent, or Firm—Roy, Kiesel & Tucker

[57] ABSTRACT

A fishing tackle organizer for securing and arranging fishing baits and lures is provided that includes a flexible nylon casing member having attached binder rings, a plurality of plastic serf-sealing storage bags attachable to the rings, and a carrying handle attached to the rings. Each plastic storage bag has a extended strip on a bottom end with two prepunched holes for securing the bag to the rings. Optionally, a pocket for holding bait jars is also provided, either as an integral part of the organizer or as a removable attachment. A replacement device having adhesive tabs for holding conventional storage bags to the binder rings is also provided.

24 Claims, 9 Drawing Sheets

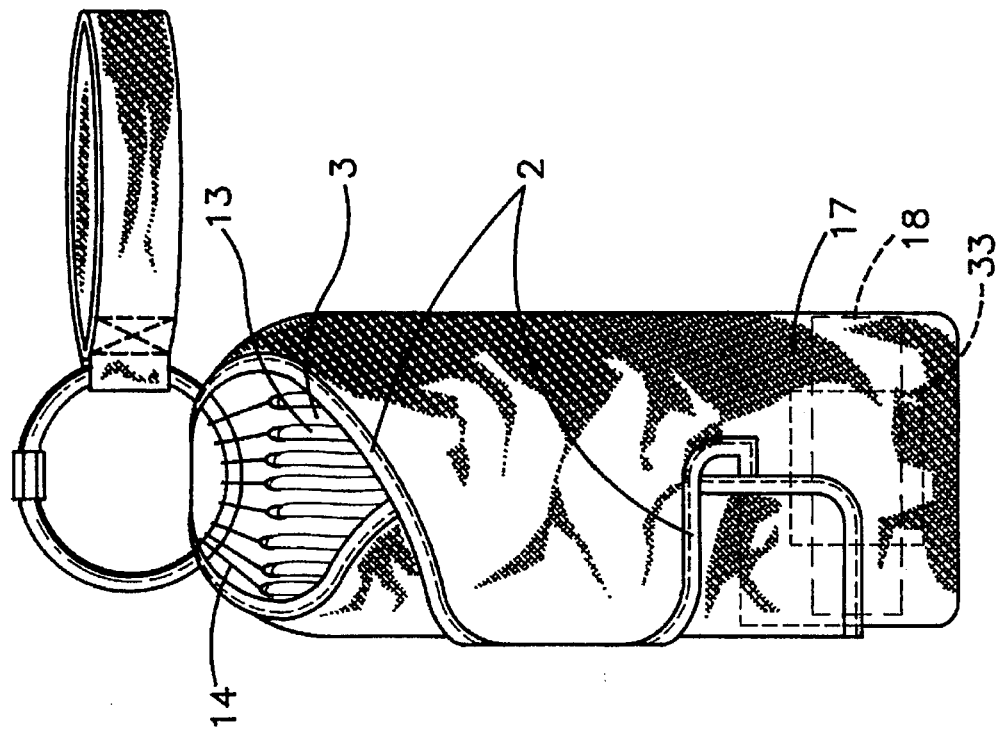
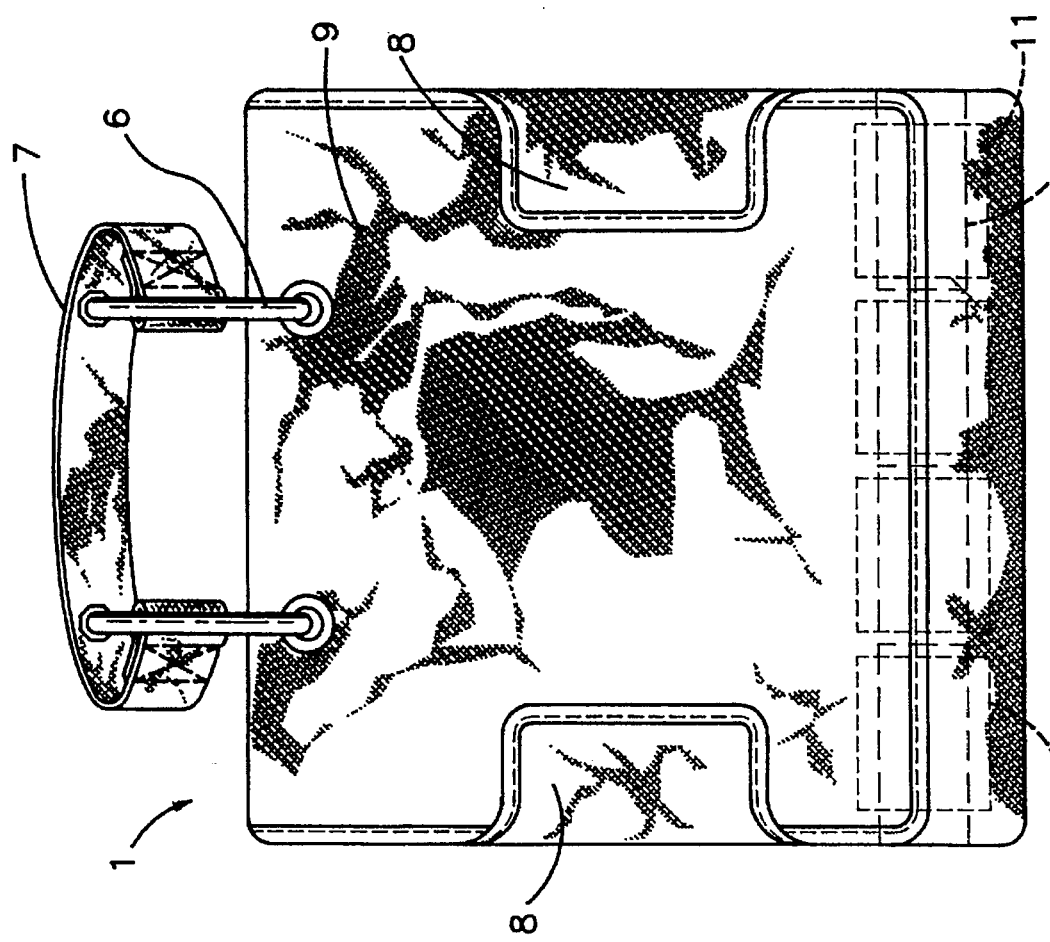

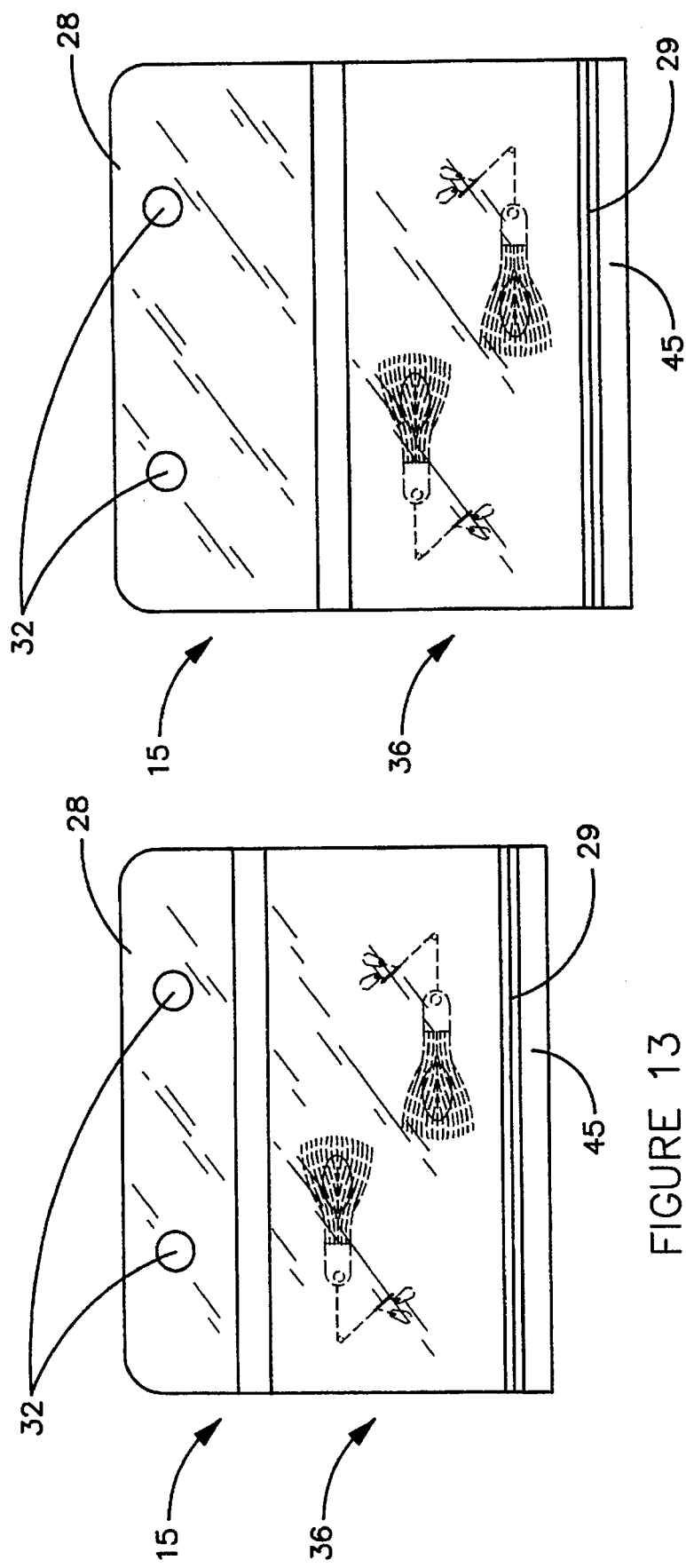

FISHING BAIT AND TACKLE ORGANIZER

This is a continuation of application Ser. No. 08/065,436 filed on May 24, 1993 now U.S. Pat. No. 5,394,638.

BACKGROUND OF THE INVENTION

I. Field of the Invention

This invention relates to fishing equipment and more particularly to devices for securing, storing, and organizing fishing baits and lures.

II. Description of the Prior Art

Fishermen carry a large variety of baits and lures in tackle devices that they use during fishing excursions. They carry a multitude of lures and baits, because different types of lures work best for certain fish and under different weather and water conditions. One of the most common types of lures is a "plastic worm", which is a worm-shaped lure made of a soft rubber material. Presently, several plastic worm and other soft-bait manufacturers market their products in plastic bags or self-sealing plastic bags for ease of use and storage. Unfortunately these bags are not designed for storage and access in conventional tackle boxes. The invention herein described is meant to allow the fisherman to store his bags of lures and soft baits in an easily accessible, secure, and organized manner, while retaining the use of the existing bags provided by the bait manufacturers.

Fishing baits and lures are often stored in plastic tackle boxes by means of a series of partitioned shelves. The tackle box is designed with compartmentalized shelves that telescope outward to expose each shelf by an expandable hinge when opened, and that collapse together when the tackle box is closed. Some current tackle boxes are simple boxes with hinged plastic covers and with a multitude of compartments for storing baits and lures. Most tackle boxes include a large non-compartmented storage area at the bottom of the box to store the necessities of fishing tackle, including spools of monofilament fishing line, knives, hooks, sinkers, pliers, etc. It is in this area of the tackle box where most fishermen store their bags of soft baits with little organization or ease of access.

Several disadvantages of the conventional fishing tackle box, as well as with other storage methods, are apparent. First, the lures and baits can become entangled by their hooks and eyelets when more than one are placed in a storage compartment. This entanglement is frustrating to the fisherman because he must pull the lures apart in order to use art individual lure. Second, plastic worms and various other soft baits are typically sold in self-sealing plastic bags that are labeled for the type of bait, weight, length, and color. These plastic bags are usually impregnated with a special lubricant to prevent the lures from drying out and to keep them from sticking together. Also, some bait manufacturers include a proprietary scent in the lubricant that they claim enhances the attractiveness of the bait to fish. The typical fishing tackle box only provides for the storage of these baits either in the bag or out of the bag. If the fisherman wishes to store an entire worm bag in a compartment of the tackle box, he must fold the bag (thereby possibly occluding the information on the bag) and place it in the compartment. This method of storing worm bags and other soft bait bags does not provide proper organization or identification when the fisherman wishes to find and use a particular bait. With the proliferation of numerous plastic worms and soft baits, past methods of storing these types of baits in a typical tackle box have become insufficient and inefficient.

Third, some plastic worm and soft-bait manufacturers do not provide self-sealing bags or containers to store their products. Without a self-sealing strip, these bags are typically very easy to open and subject to having their contents spill out, thereby requiring the fisherman to store the contents either in a recloseable bag (such as a self-sealing food bag), or, less preferably, in one of the exposed compartments of the tackle box. Either storage method usually exposes the lure to sunlight, water, and other weather conditions, thereby significantly increasing the weathering and discoloring of the lure. Plastic worms and soft baits are especially susceptible to drying-out when exposed to air, heat, and water for several days. They also have a tendency to decompose under these conditions and melt in the compartment in which they are stored. If the hooks attached to some baits and lures are not manufactured from stainless steel or brass, they tend to corrode over time under the constant presence of salt and fresh water. This hook corrosion problem is increasing, because galvanized steel hooks, which corrode easily, are becoming more popular with fishermen, especially for offshore fishing, because they break down if they are left in the fish's mouth upon release, thus providing an ecological, benefit.

Fourth, most tackle boxes are made of hard plastic and can be quite large, thereby causing damage to fiberglass boats and presenting difficulty of storage in the boat. The typical tackle box is difficult to maneuver on a boat and has a tendency to spill easily, dumping a good portion of the contents into the boat, causing great frustration to the fisherman. Because it is difficult to position and maneuver a large tackle box on a fisherman's lap when he is sitting down on a boat seat, the fisherman usually places the tackle box on the deck of the boat. When opened, the tackle box is an easy target for accidental spillage during fishing.

One of the ways in which the recreational fishing industry has addressed the problems of the conventional tackle box was to develop so-called "soft tackle" systems. Most of these systems employ a three-ring or two-ring binder system sewn into a nylon, zippered case. These systems provide pre-punched, self-sealing plastic bags for the storage of soft baits, but do not allow for the use of existing bags provided by the bait manufacturers. Soft bait manufacturers are increasingly providing high-quality, self-sealing plastic laminate bags that contain proprietary lubricants and scents that enhance the longevity and enticement of the baits. The bags are also typically composed of a laminate plastic that is resistant to ultraviolet radiation, principally because the specially colored plastic baits tend to fade from constant exposure to the sun. If the fisherman must remove the baits from the existing bag to place them in another bag, the value of the lubricants, scents, and the ultraviolet protection is lost. Moreover, the existing bag is usually discarded, thus causing a disadvantage to the environment because the bags cannot be recycled.

In the event, however, that the original protective bags are either incapable by design of satisfactorily retaining the contents, or if they become damaged, it may be necessary to place the plastic worms in a replacement bag, such as a standard self-sealing or Ziplock® bag. With current soft tackle systems, there is no easy way to secure these replacement bags to the binder, except by punching holes through the bags and attaching them to the binder rings. This method, of course, negates the advantages of having a sealed bag and can cause the bags to tear away at the punched holes when under normal stress.

SUMMARY OF THE INVENTION

It is therefore an object of this invention to provide an improved device for securing, storing, and organizing fishing baits and lures.

Another object of this invention is to provide fishermen quick and easy access to a variety of baits and lures.

It is also an object of this invention to provide a device which enables the use of existing bait bags in order to retain the advantage of special lubricants, scents, and ultraviolet protection provided with such bags, and in a small way, add some measure of protection to the environment.

Yet another object of this invention is to provide a device for attaching standard, self-sealing replacement bags to a soft tackle system.

These and other objects and advantages of the present invention will no doubt become apparent to those skilled in the art after having read the following description of the preferred embodiment.

Therefore, a device for securing, storing and organizing materials such as fishing tackle lures and baits is provided, comprising a flexible casing member; ring means connected to said casing member for enabling perforated articles to be attached thereto; a plurality of stackable storage bags, each said storage bag having a perforated strip for matable engagement with said ring means, and a single self-sealing opening; and wherein said casing member is foldable over said storage bags to protect said storage bags. Also provided is a device for attaching storage bags to the rings of a binder, comprising a bridge portion having holes spaced therealong to matably engage said rings; a first tab portion, extending along said bridge portion opposite said holes, and having a first adhesive surface for permanently contacting one of said storage bags; and a first protective sheet covering said first adhesive surface, said first protective sheet being removable prior to contact with said storage bag.

BRIEF DESCRIPTION OF THE DRAWINGS

FIG. 4 is a front view of an alternate embodiment of the invention which includes a compartment for the storage of pork rind jars.

FIG. 5 is a side view of the invention of FIG. 4.

FIG. 13 is a plan view of a shorter version of the unitary storage bag of FIG. 12.

FIG. 14 is a plan view of a storage bag of unitary construction having an larger, offsetting strip.

DETAILED DESCRIPTION OF THE PREFERRED EMBODIMENTS

Figure 2:
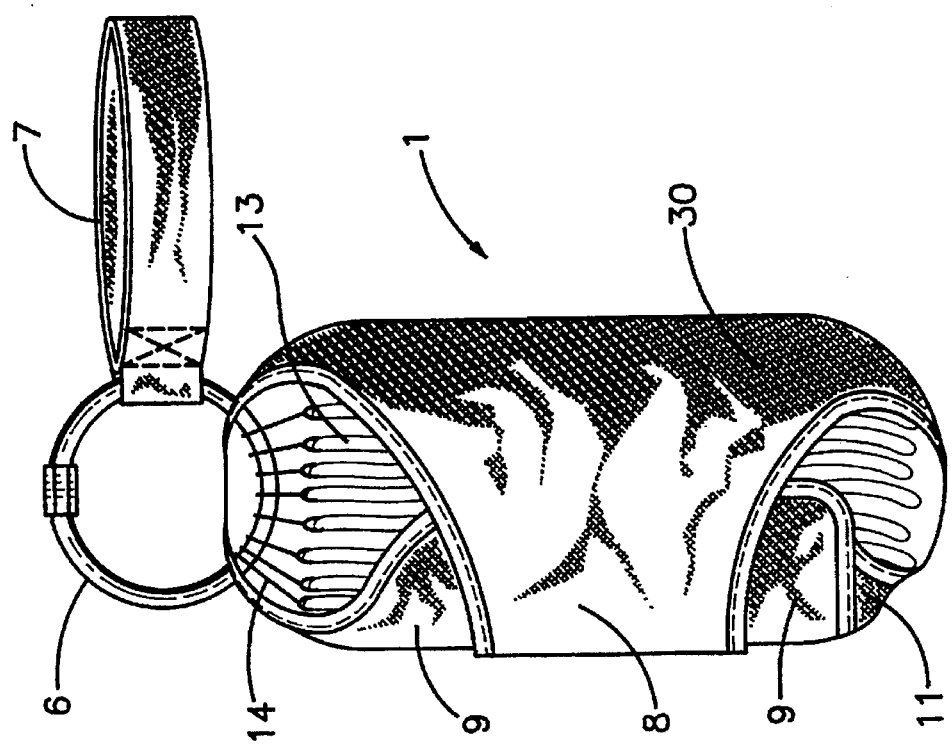
FIG. 2 is a side view of the invention of FIG. 1.

In the description that follows, similar parts are indicated throughout the specification and the drawings, respectively. The drawings are not necessarily to scale and in some instances, proportions have been exaggerated in order to more clearly depict certain features of the invention. Also in the drawings, many details pertaining to fabrication and maintenance utility well established in the machine construction art and not bearing upon points of novelty are omitted in the interest of descriptive clarity and efficiency. Such details may include threaded connections, lockrings, shear pins, weld lines and the like.

Figure 1:
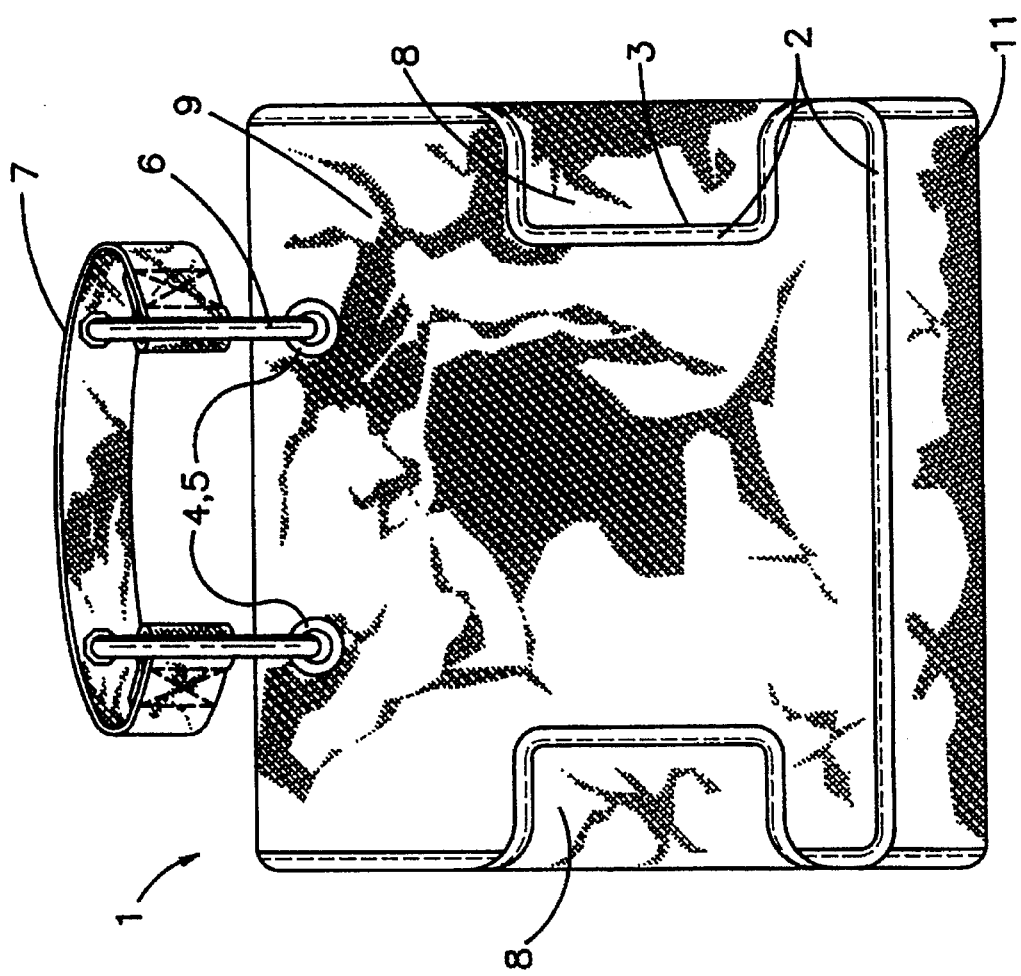
FIG. 1 is a front view of a preferred embodiment of the invention, showing the device in a closed position.
Figure 3:
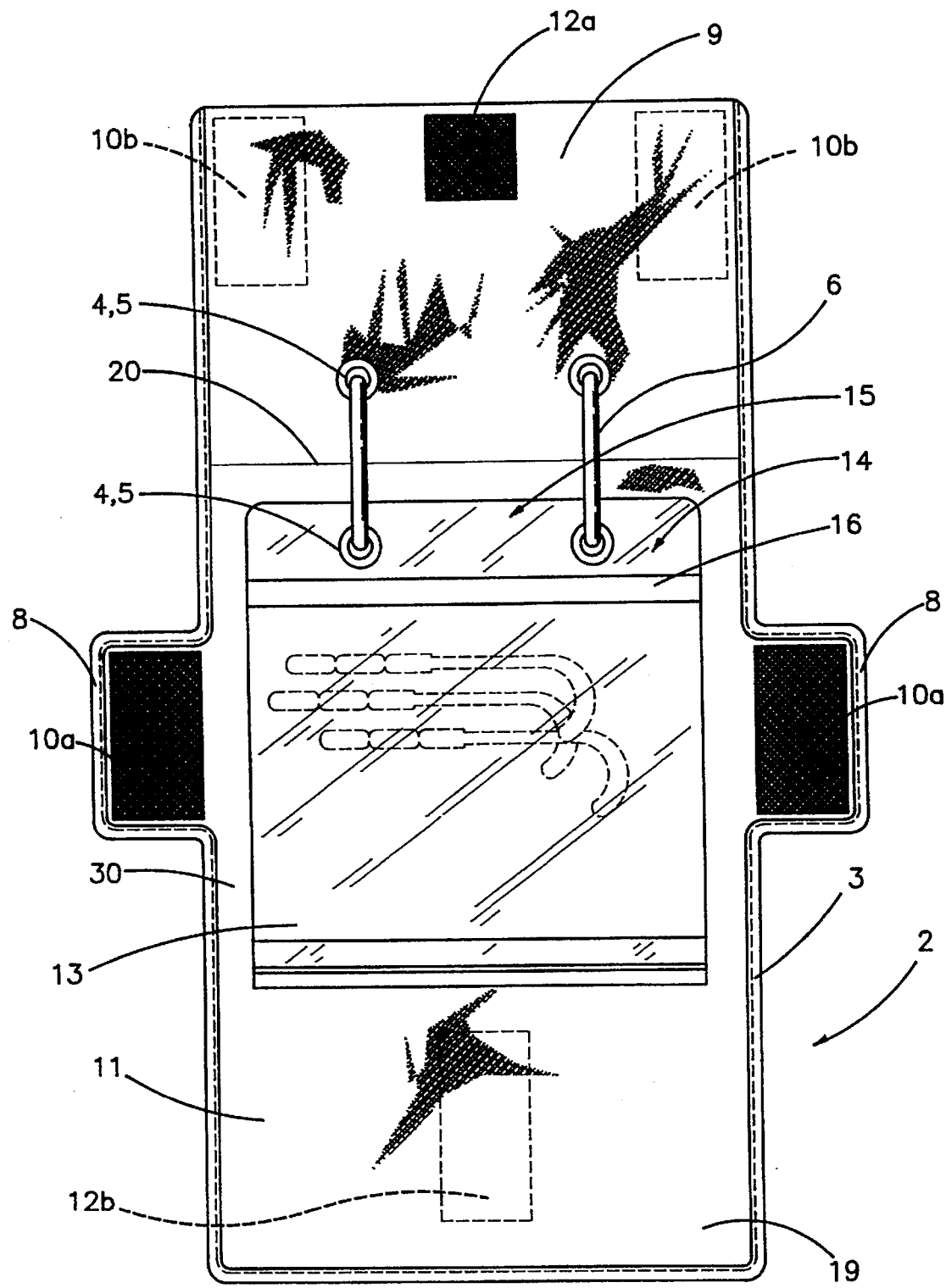
FIG. 3 is a plan view of the invention of FIG. 1 in an open position depicting the casing design and the storage bags.

Referring to FIGS. 1–3, a frontal view of the device used for organizing, storing and carrying fishing lures and baits is shown in FIGS. 1 and 2 with the invention in a fully closed position. FIG. 3 depicts the invention in an open position. The device is comprised generally of casing 1, preferably manufactured of a water-repellent fabric (such as 1000 Denier nylon with a polyurethane coating), having a top portion 9, a middle portion 30, and a bottom portion 11. Two extension flaps 8 of the same material as casing 1 extend on either side of middle portion 30, each having a strip of hook or loop fabric 10a from a hook and loop fastening means, such as one-half of a complete VELCRO® strip, on the inside surface of casing 1. Mating strips 10b are likewise attached to the outside surface of casing 1 on top portion 9 in positions which will allow fabric interlocking of strips 10a and 10b when the device is closed. Similarly, top portion 9 has at least one hook or loop strip 12a on the inside surface of casing 1 which is matable with a corresponding mating strip 12b on the outside surface of casing 1 on bottom portion 11. When the device is closed, the various parts of casing 1 overlap in the manner depicted in FIGS. 1 and 2.

Casing 1 has two pairs of holes 4 punched into the fabric with grommets 5, preferably brass, stamped onto the fabric to protect the fabric from fraying or tearing at holes 4. Two locking or snap rings 6 of conventional design, preferably stainless steel or brass, are passed loosely through their respective pair of grommeted holes 4 which become aligned as casing 1 is closed. Holes 4 should be large enough to allow easy passage of the opening mechanism of snap ring 6 when adding or removing bags 13. Because a portion of snap rings 6 is exposed outside of casing 1, handle 7, preferably made from a heavy-duty polyester weave webbing material, has ends which are sewn in a loop about each snap ring 6. The loose fit between snap rings 6 and casing 1 allow for casing 1 to be more pliable than prior art products, because the snap rings 6 can easily be moved from side to side within holes 4 relative to casting 1. The exposed edges 2 of casing 1 are finished with a bias material 3, preferably a polyester weave, sewn to casing 1. Casing 1 also has an inside lining 19 of polyurethane material adhered to the inside surface of the casing 1 to provide a durable, weather-resistant, smooth surface for the storage of bags 13 containing the lures.

Figure 11B:
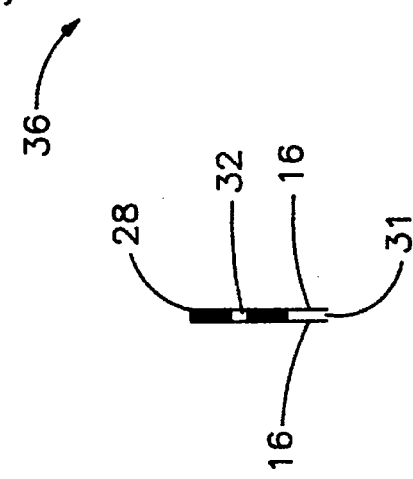
FIG. 11b is a cross-sectional view of the attachment means showing the adhesive tabs.
Figure 11A:
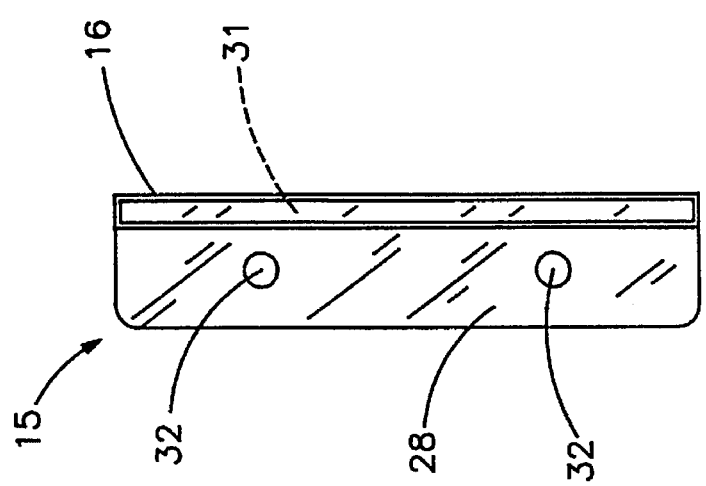
FIG. 11a is a plan view of the attachment means showing the adhesive tabs.

A plurality of storage bags 13 are held within casing 1 by way of attachment means 14 interposed between storage bags 13 and snap rings 6. In a preferred embodiment shown in more detail in FIGS. 11a and 11b, attachment means 14 comprises a bridge portion 15 consisting essentially of a strip 28 of semi-rigid, high-density plastic at least as wide as storage bag 13, and a pair of parallel tabs 16, preferably comprised of plastic laminate, extending along the side of strip 28 opposite snap rings 6. Strip 28 also includes holes 32 which allow connection of bridge portion 15 to snap rings 6. The facing surfaces of tabs 16 include an adhesive material which can adhere to each side of the bottom of storage bags 13 to form a strong, permanent, and water-tight bond. Immediately prior to use, the paper backing 31, which initially covers the inside surfaces of tabs 16, is moved to expose the adhesive material. Although less preferable, it is possible to have only a single tab 16 with adhesive material attached to bridge portion 15 as long as bags 13 remain securely held.

Figure 12:
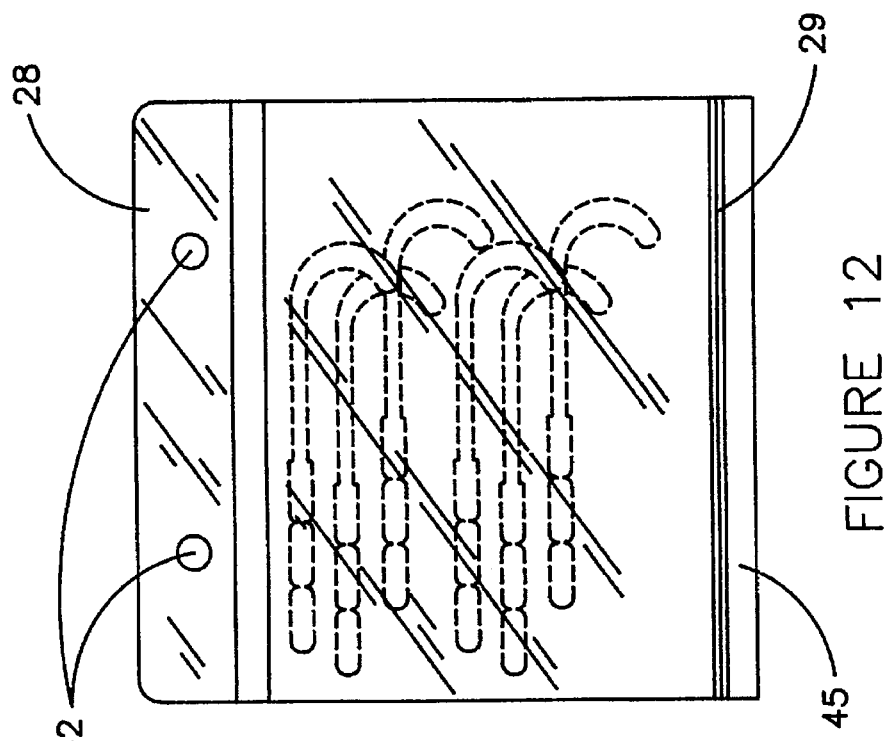
FIG. 12 is a plan view of a storage bag of unitary construction with means for direct attachment to the snap rings.

In alternate embodiments shown in FIGS. 12–14, the advantages of storage bags 13 and attachment means 14 can be merged to form a storage bag 36 of unitary construction that is directly attachable to snap rings 6. Storage bag 36 includes strip 28 at the bottom of each bag, thereby eliminating the need for the adhesive tabs 16, and can be manufactured in long or short versions, shown in FIGS. 12 and 13, respectively. Additionally, storage bags 236 of small volumes can have a longer offset bridge portion 15, i.e. the length being in a direction perpendicularly away from snap rings 6, thus offsetting the opening 29 so that the contents can be retrieved as easily as storage bags 36 of conventional size. Advantageously, the storage bags 36 of FIG. 13 ("short offset") and 14 ("long offset") can be attached in an alternating manner when placed onto snap rings 6 so that the compartment of the "long offset" bag rests beyond the compartment of the "short offset" bag. The advantage of this design is that both compartments of the "long offset" bag and the "short offset" bag are staggered instead of being stacked directly on top of each other. This allows the contents of each bag, such as spinner lures, to occupy less volume within the casing 1, thus allowing more lures to be stored and providing additional protection to the heads and spoons of the spinner lures. Of course, the attachment means 14 shown in FIG. 8 and described above may also be manufactured to have both long and short bridge portions 15 in order to achieve the same advantages as the bags 36 in FIGS. 13 and 14 when standard self-sealing bags are employed.

Storage bags 13,36 are preferably transparent, heavy-duty polyethylene bags having a single self-sealing opening 29, preferably of the ZIPLOCK® type, with a lip 45 for pulling apart the sides of opening 29. Most often, the original soft-bait bags in which the plastic worms are marketed can be used with attachment means 14, because many have self-sealing openings 29. However, if the original bag cannot be used, widely available storage bags 13 found in most stores can be used. Attachment of the storage bags 13 with the bottom nearest the snap rings 6 allows the self-sealing opening 29 of each storage bag 13,36 to be easily accessible to the fisherman when casing 1 is opened. The size and strength of casing 1 and snap rings 6 are such that the weight and volume of a large number of storage bags 13,36 can be accommodated, thus providing a compressed, organized, and stacked system of storage compartments within the confines of the casing 1 when closed.

Figure 6:
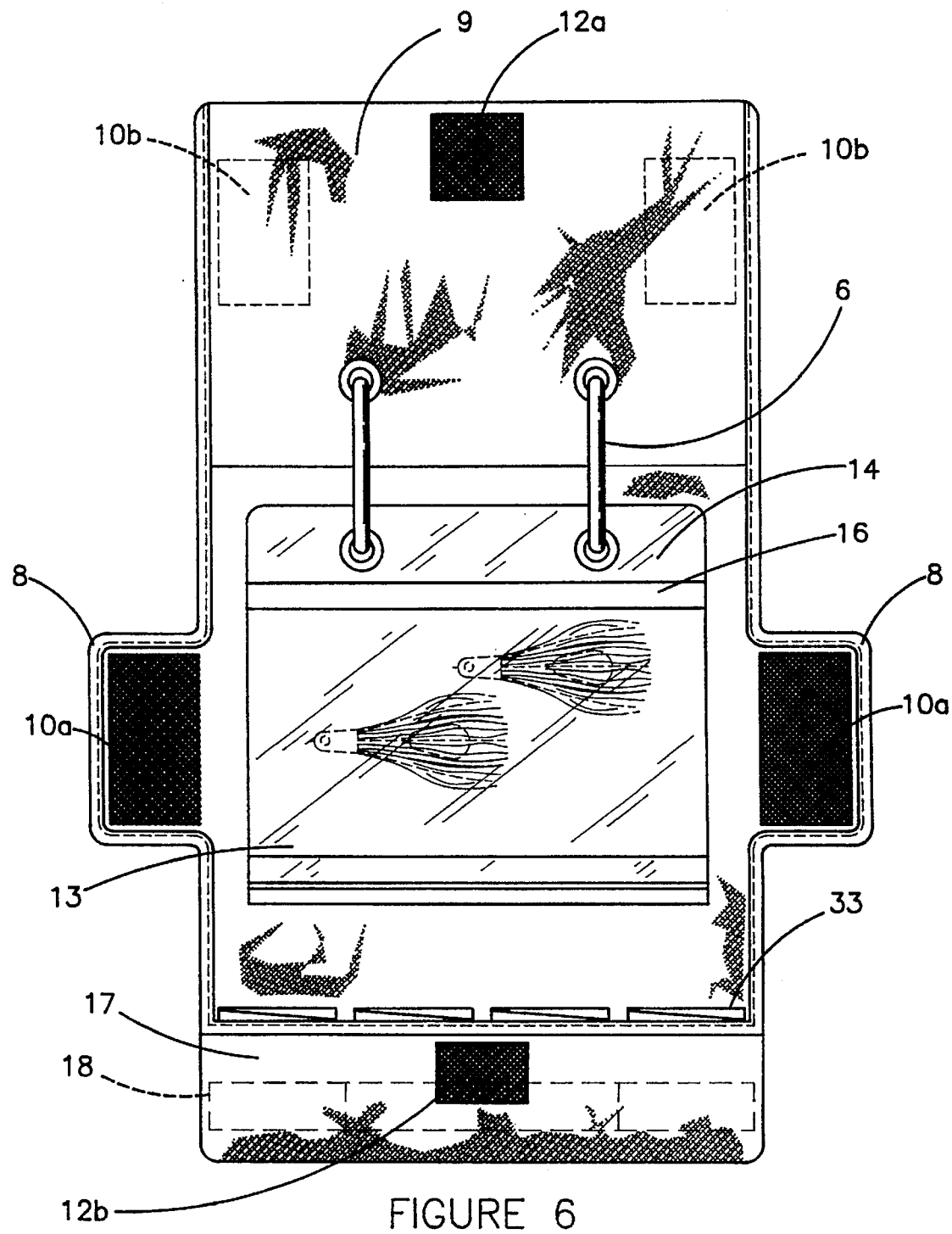
FIG. 6 is a plan view of the invention of FIG. 4 in an open position depicting the casing design, storage bags, and the compartment for the storage of pork rind jars.

An alternate embodiment of the present invention is depicted in FIGS. 4–6 which provides an additional means for carrying pork rinds, which are very popular baits among fishermen. This embodiment is identical to the embodiment of FIGS. 1–3, except that the bottom portion 11 of casing 1 is formed into a pocket 17 which can completely enclose jars of pork rinds 33 placed therein. Pocket 17 can holds a plurality of pork rind jars 33 which are secured within casing 1 by a number of elastic bands 18, preferably constructed of a polyester weave with elastic, sewn to the inside surface of casing 1 within pocket 17 and looped to receive and secure the jars 33. As seen in FIG. 6, a VELCRO strip 12a on top portion 9 is matable with a corresponding strip 12b on the front surface of pocket 17 when casing 1 is closed.

Figure 7:
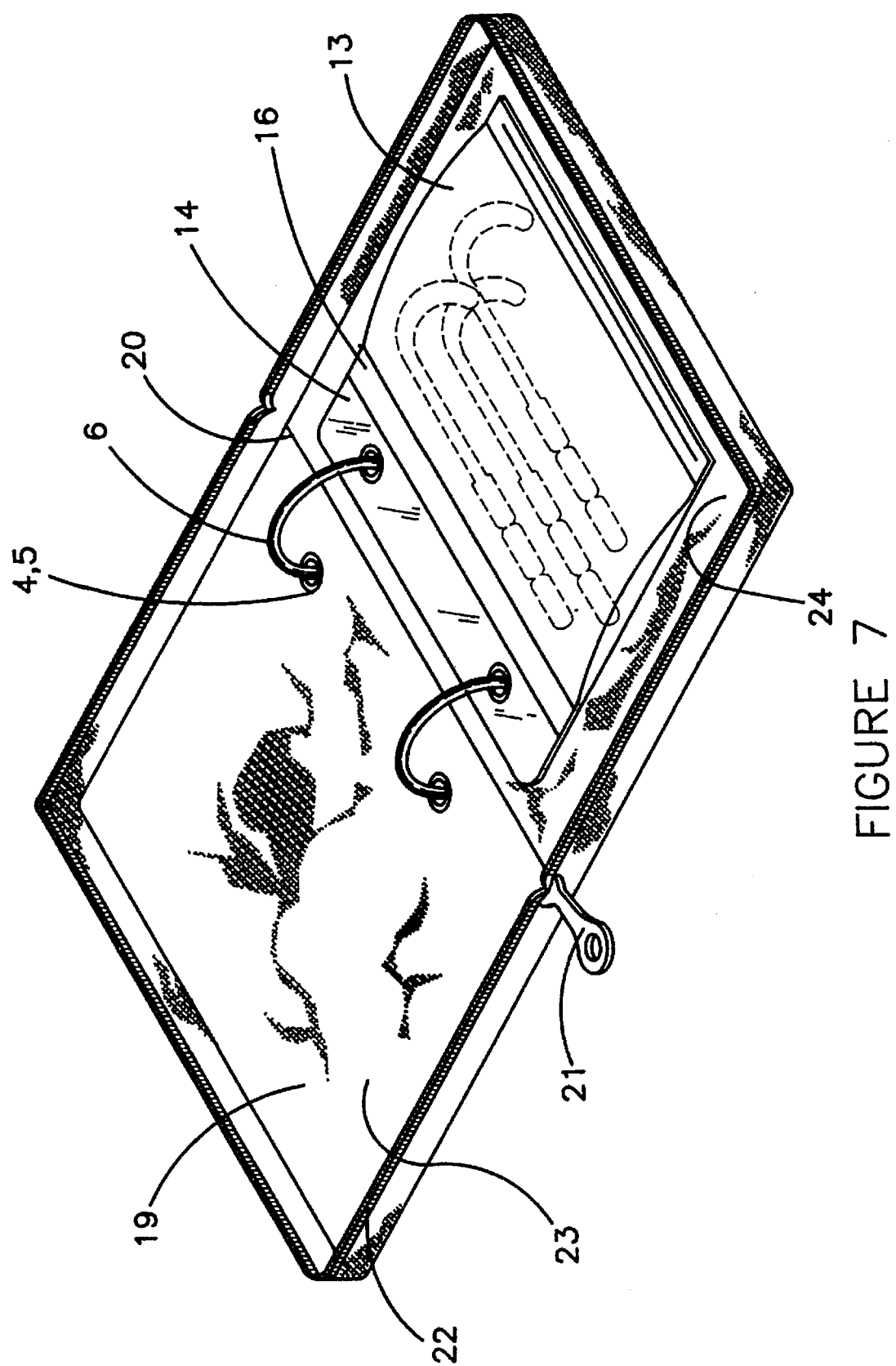
FIG. 7 is a view of an alternate embodiment of the invention which uses a zippered casing and is shown in an open position.
Figure 9:
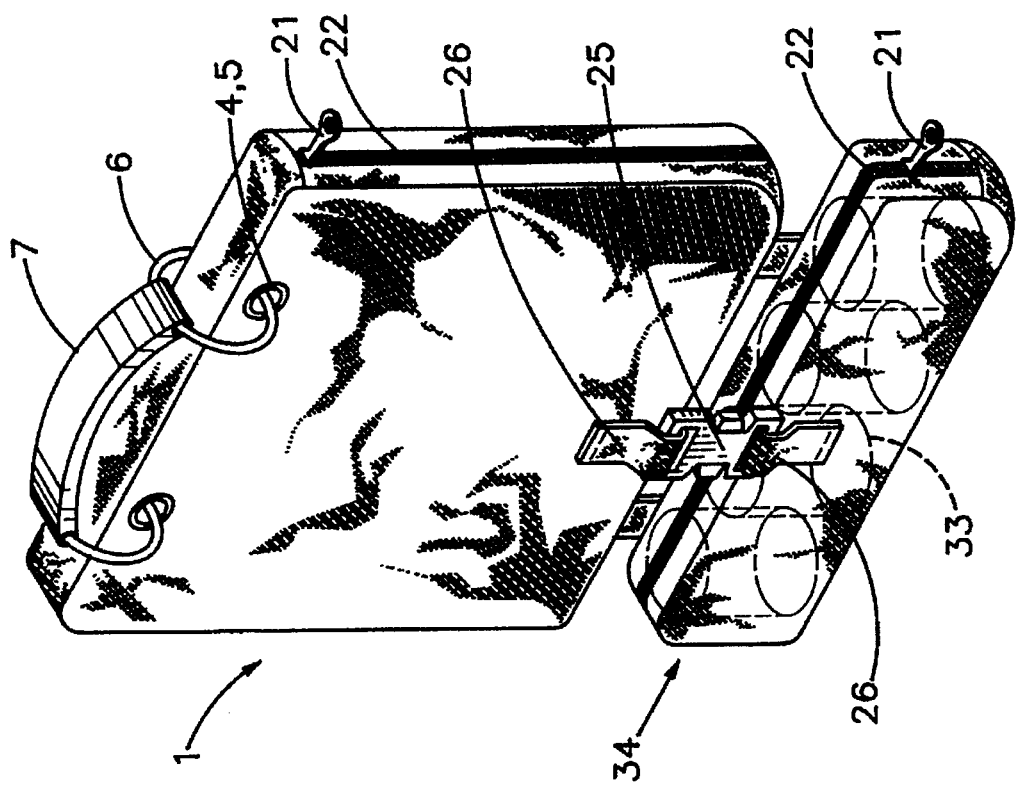
FIG. 9 is a view of an alternate embodiment of the invention which includes a removable pork rind casing.
Figure 8:
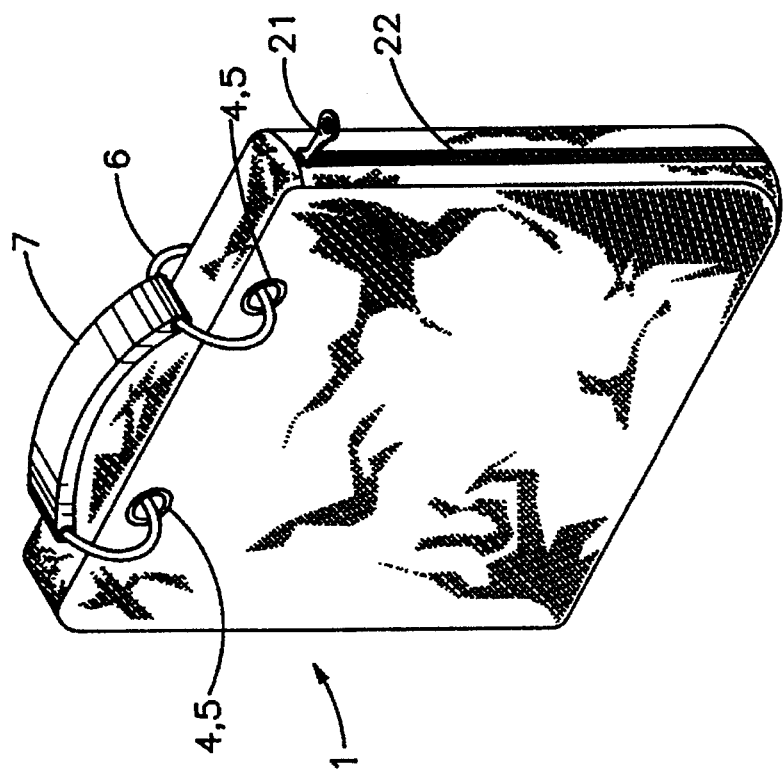
FIG. 8 is a view of the invention of FIG. 7 shown in a closed position.

Another alternate embodiment of the present invention is shown in FIGS. 7 and 8, depicting open and closed positions, respectively, of a tackle organizer having a zipper 22 and slide 21, rather than foldable flaps. Zipper 22 is preferably constructed of rolled nylon attached to a polyester weave tape. The differences in the casing 1 from the embodiment of FIGS. 1–3 is that only a first and second portion 23,24 are present, and which are folded together along a center fold 20. Closure of the device is accomplished simply by zipping first and second portions 23,24 together with the zipper 22 that extends along three sides of the organizer. As shown in FIG. 9, an optional secondary zippered casing 34 for carrying jars of pork rinds 33 can be attached to the zippered embodiment of FIG. 7 by the use of two or more releasable, snap buckles 25. Two male or female buckle portions 25 having nylon webbing base strips 26 can be sewn onto secondary casing 34 which would matably connect with corresponding buckle portions 25 sewn onto the organizer casing 1.

Figure 10:
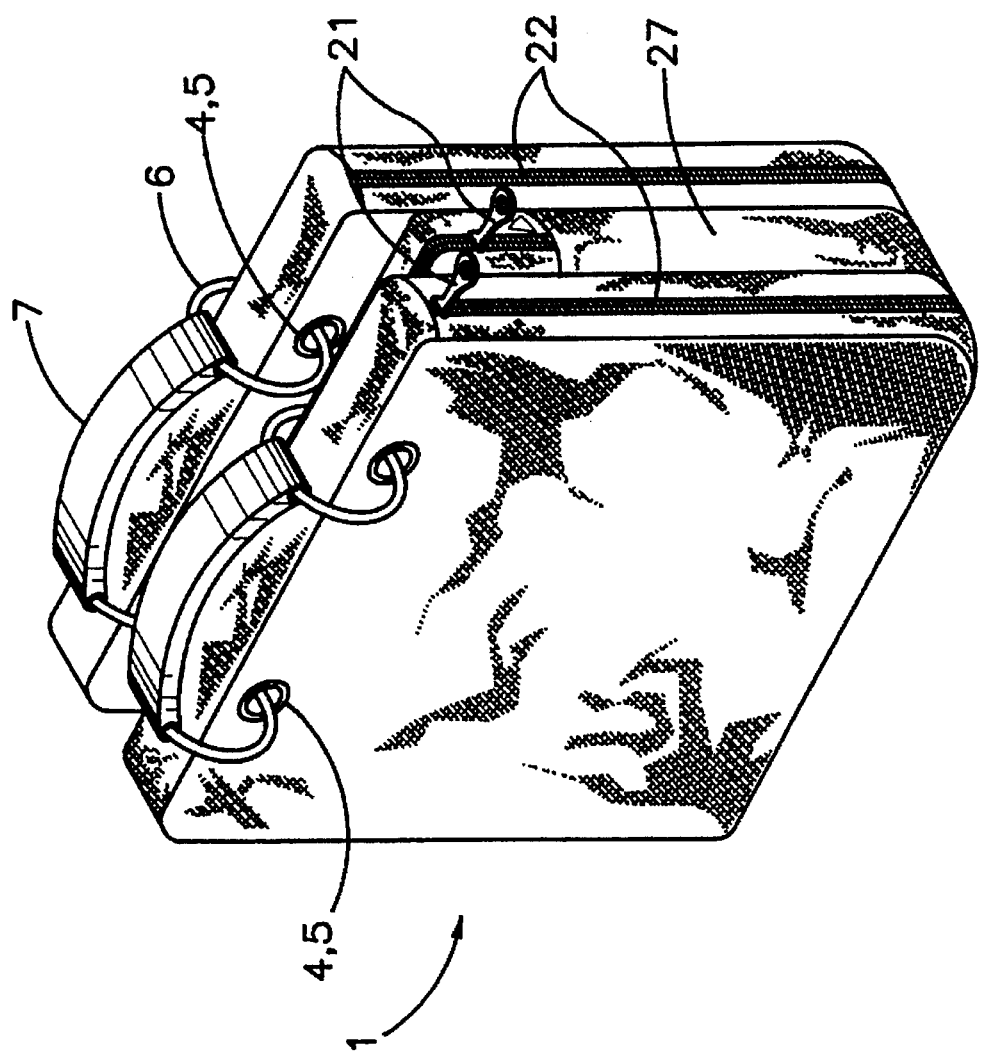
FIG. 10 is another alternate embodiment of the invention which combines two zippered casings and a central zippered pouch.

Another alternate embodiment shown in FIG. 10 essentially comprises two complete zippered tackle organizers as previously described and shown in FIGS. 7 and 8, which are attached to each other by another portion of casing material 35. This additional portion of casing material 35, sewn onto both zippered organizers along three sides, forms a pouch 27 between the constituent organizers. Thus, various and miscellaneous fishing baits, lures and other equipment can be conveniently stored in pouch 27. A zipper and slide 22,21 of construction as previously explained is used to open and close pouch 27.

Although the present invention has been described in terms of specific embodiments, it is anticipated that alterations and modifications thereof will no doubt become apparent to those skilled in the art. It is therefore intended that the following claims be interpreted as covering all such alterations and modifications as fall within the true spirit and scope of the invention.

What is claimed:

1. An organizer for fishing bait and tackle, comprising:
   (1) a flexible first casing with a handle attached thereto;
   (2) an attachment means for adhesively attaching storage bags to said casing comprising:
      a bridge portion removably attachable to said casing;
      (ii) a first tab portion, positioned on said bridge portion and having a first adhesive surface for attaching a storage bag.

2. An organizer according to claim 1, further comprising:
   (a) a second tab portion positioned on said bridge portion parallel to said first tab portion; and
   (b) said second tab portion having a second adhesive surface facing said first adhesive surface such that both first and second adhesive surfaces are attached to a storage bag.

3. An organizer according to claim 1, wherein said tab portions extend along the length of said bridge portion.

4. An organizer according to claim 2, wherein said first and second adhesive surfaces have a protective cover, said protective cover being removable prior to contact with a storage bag.

5. An organizer according to claim 2, wherein said casing includes a pouch adapted to contain a bait jar.

6. An organizer according to claim 5, wherein said pouch includes a plurality of looped elastic bands attached to said casing member for holding a plurality of bait jars.

7. An organizer according to claim 2, wherein said bridge portion is a long bridge portion, said organizer further having a short bridge portion, such that said long bridge portion extends beyond an opening of a storage bag attached to said short bridge portion to enable a space-saving, staggered arrangement of a plurality of storage bags.

8. An organizer according to claim 2, wherein said bridge portion is a long bridge portion, said organizer further having a short bridge portion, wherein said long bridge portion is greater in length than said short bridge portion, such that storage bags may be positioned in a space-saving, staggered arrangement.

9. An organizer according to claim 2, wherein said casing includes a top portion and a bottom portion and a zipper means operatively attached to said top portion and said bottom portion for closing said casing.

10. An organizer according to claim 9, further comprising a zippered pouch, adapted to contain a plurality of bait jars, removably attachable to said casing.

11. An organizer according to claim 1, wherein a second casing is attached to said first casing, each said casing having a top portion and a bottom portion and a zipper means operatively attached to said top portion and said bottom portion of each said casing for closing each said casing around a storage bag.

12. An organizer according to claim 11, wherein said first and second casings are permanently attached to one another by a strip of casing material which extends around the perimeter of said casings, thereby forming a sealable enclosure between said casings.

13. An organizer for fishing bait and tackle, comprising:
  (a) a casing;
  (b) a plurality of bridge portions, said bridge portions being removably attachable to said casing.
  (c) a first tab portion, positioned on each of said bridge portions and having a surface for connecting to a storage bag; and
  (d) a plurality of storage bags, each of said plurality of storage bags being connectable to at least one of said first tab portions.

14. An organizer according to claim 13, wherein each of said bridge portions has at least one hole spaced therealong and said bridge portions are removably attachable to said casing via said hole.

15. An organizer according to claim 14, wherein each said storage bag has a self-sealing opening positioned opposite said hole.

16. An organizer according to claim 13, wherein each said first tab portion has an adhesive surface.

17. An organizer according to claim 16 wherein each said bridge portion has a second tab portion attached thereto, said second tab portion being positioned on said bridge portion parallel to said first tab portion and having an adhesive surface facing said adhesive surface of said first tab portion, such that both adhesive surfaces are attachable to a storage bag.

18. An organizer according to claim 13, wherein said casing comprises a flexible material.

19. An organizer according to claim 13, wherein said casing comprises a continuous piece of material substantially enclosing said storage bags.

20. An organizer according to claim 19, wherein said casing comprises a top portion, a middle portion and a bottom portion, and wherein said top portion is attachable to said bottom portion.

21. An organizer according to claim 20, wherein said middle portion further comprises two or more opposing flaps attachable to said top portion.

22. An organizer according to claim 19, wherein said casing includes a pouch adapted to contain a bait jar.

23. An organizer according to claim 22, wherein said pouch includes a plurality of looped elastic bands attached to said casing for holding a plurality of bait jars.

24. An organizer according to claim 13 having a handle attached thereto.

* * * * *